United States Patent
Rothmeyer et al.

(10) Patent No.: US 12,372,074 B1
(45) Date of Patent: Jul. 29, 2025

(54) PISTON RETAINER PLATE

(71) Applicant: Hamilton Sundstrand Corporation, Charlotte, NC (US)

(72) Inventors: Jonathon Rothmeyer, Rockford, IL (US); Edward Goy, Crystal Lake, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/781,295

(22) Filed: Jul. 23, 2024

(51) Int. Cl.
*F04B 1/126* (2020.01)
*F16J 1/10* (2006.01)

(52) U.S. Cl.
CPC ............... *F04B 1/126* (2013.01); *F16J 1/10* (2013.01)

(58) Field of Classification Search
CPC ...................... F04B 1/126; F16J 1/10
See application file for complete search history.

(56) References Cited

U.S. PATENT DOCUMENTS

| | | | | |
|---|---|---|---|---|
| 2,947,182 A * | 8/1960 | Wahlmark | ............ | F01B 3/0088 92/187 |
| 4,304,173 A * | 12/1981 | Brille | ............ | F16H 23/08 92/13.7 |
| 6,343,888 B1 | 2/2002 | Huehn et al. | | |
| 7,975,600 B2 * | 7/2011 | Beck | ............ | F04B 1/126 92/57 |
| 8,850,953 B2 * | 10/2014 | Roth | ............ | F16J 1/22 92/12.2 |
| 9,506,456 B2 * | 11/2016 | Sitzler | ............ | F04B 1/126 |
| 9,850,757 B2 | 12/2017 | Bergmann | | |
| 2005/0186085 A1 * | 8/2005 | Galba | ............ | F04B 1/126 417/269 |
| 2006/0180016 A1 * | 8/2006 | Kurz | ............ | F04B 1/126 92/70 |

FOREIGN PATENT DOCUMENTS

| DE | 102020212372 A1 * | 3/2022 | | |
|---|---|---|---|---|
| WO | WO-0198656 A1 * | 12/2001 | .............. | F04B 1/126 |
| WO | WO-2022028735 A1 * | 2/2022 | | |

* cited by examiner

*Primary Examiner* — Thomas E Lazo
(74) *Attorney, Agent, or Firm* — Kinney & Lange, P.A.

(57) ABSTRACT

A piston retainer plate includes a first end, a second end opposite the first end, a piston pocket extending from the first end to the second end, a straight annular surface extending from the first end, an angled annular surface extending at an angle from the second end, a curved annular surface connected to the straight annular surface and the angled annular surface, the curved annular surface being between the straight annular surface and the angled annular surface, and a curved vent within the curved annular surface. The straight annular surface, the angled annular surface, and the curved annular surface define the piston pocket.

20 Claims, 7 Drawing Sheets

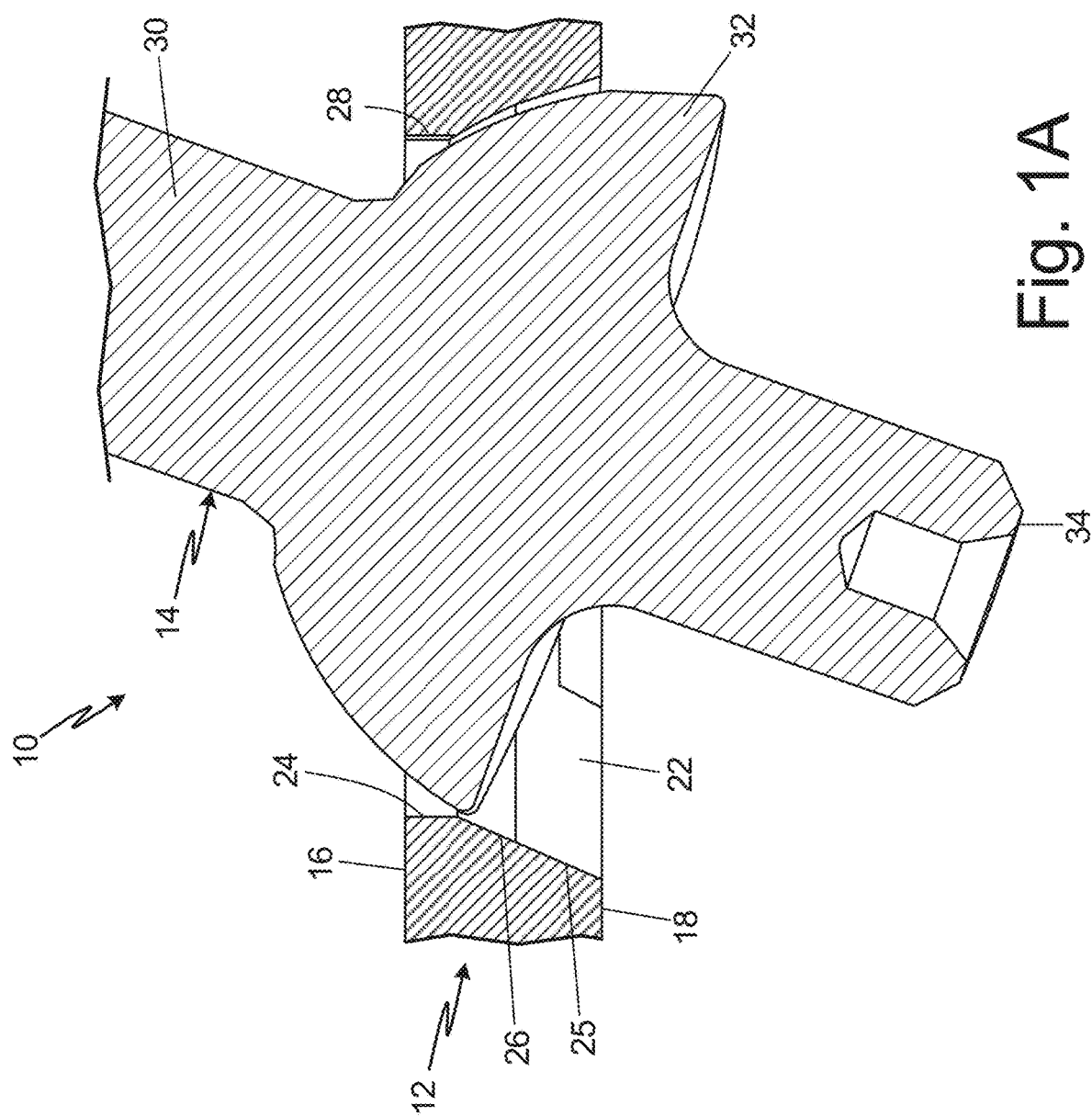

PISTON RETAINER PLATE

BACKGROUND

The present disclosure relates to bent-axis fuel variable displacement piston pumps, and in particular, to piston retainer plates.

A bent-axis fuel variable displacement piston pump has a piston assembly that includes a piston and a piston retainer plate. The piston retainer plate holds the piston, which extends through a piston pocket in the piston retainer plate. The piston rotates within the piston pocket of the piston retainer plate along the bent axis. As the piston moves, portions of the piston contact the piston retainer plate.

SUMMARY

In some examples, a piston retainer plate may include a first end, a second end opposite the first end, a piston pocket extending from the first end to the second end, a straight annular surface extending from the first end, an angled annular surface extending at an angle from the second end; a curved annular surface connected to the straight annular surface and the angled annular surface, the curved annular surface being between the straight annular surface and the angled annular surface, and a curved vent within the curved annular surface. The straight annular surface, the angled annular surface, and the curved annular surface define the piston pocket.

In some examples, a piston assembly may include a piston and a piston retainer plate. The piston includes a piston shaft and a curved piston portion extending from the piston shaft adjacent an end of the piston shaft. The piston retainer plate includes a straight annular surface extending from a first end, an angled annular surface extending at an angle from a second end, a curved annular surface connected to the straight annular surface and the angled annular surface, and a curved vent within the curved annular surface. The piston extends through the piston retainer plate. The curved vent of the piston retainer plate is positioned within the curved annular surface at a portion of the curved annular surface that has the most contact with the curved piston portion of the piston.

In some examples, a piston assembly for a bent-axis fuel variable displacement piston pump may include a piston configured to move on a bent axis and a piston retainer plate configured to hold the piston. The piston retainer plate includes a piston pocket extending through the piston retainer plate, the piston pocket being configured to hold the piston, a curved annular surface that defines a portion of the piston pocket, and a curved vent in the curved annular surface. The curved vent is configured to receive fuel from within the piston pocket when the piston is moving toward the curved annular surface and release fuel into the piston pocket when the piston is moving away from the curved annular surface.

BRIEF DESCRIPTION OF THE DRAWINGS

FIG. 1A is a partial cross-sectional view of a piston assembly showing a piston within a piston pocket of a first embodiment of a piston retainer plate.

DETAILED DESCRIPTION

In general, the present disclosure describes a piston retainer plate for a bent-axis fuel variable displacement piston pump that includes a curved vent that extends into a curved annular surface that defines the piston pocket to decrease localized contact stress between the piston and the piston retainer plate and to allow for fuel venting to decrease fuel pressure.

Figure 1B:
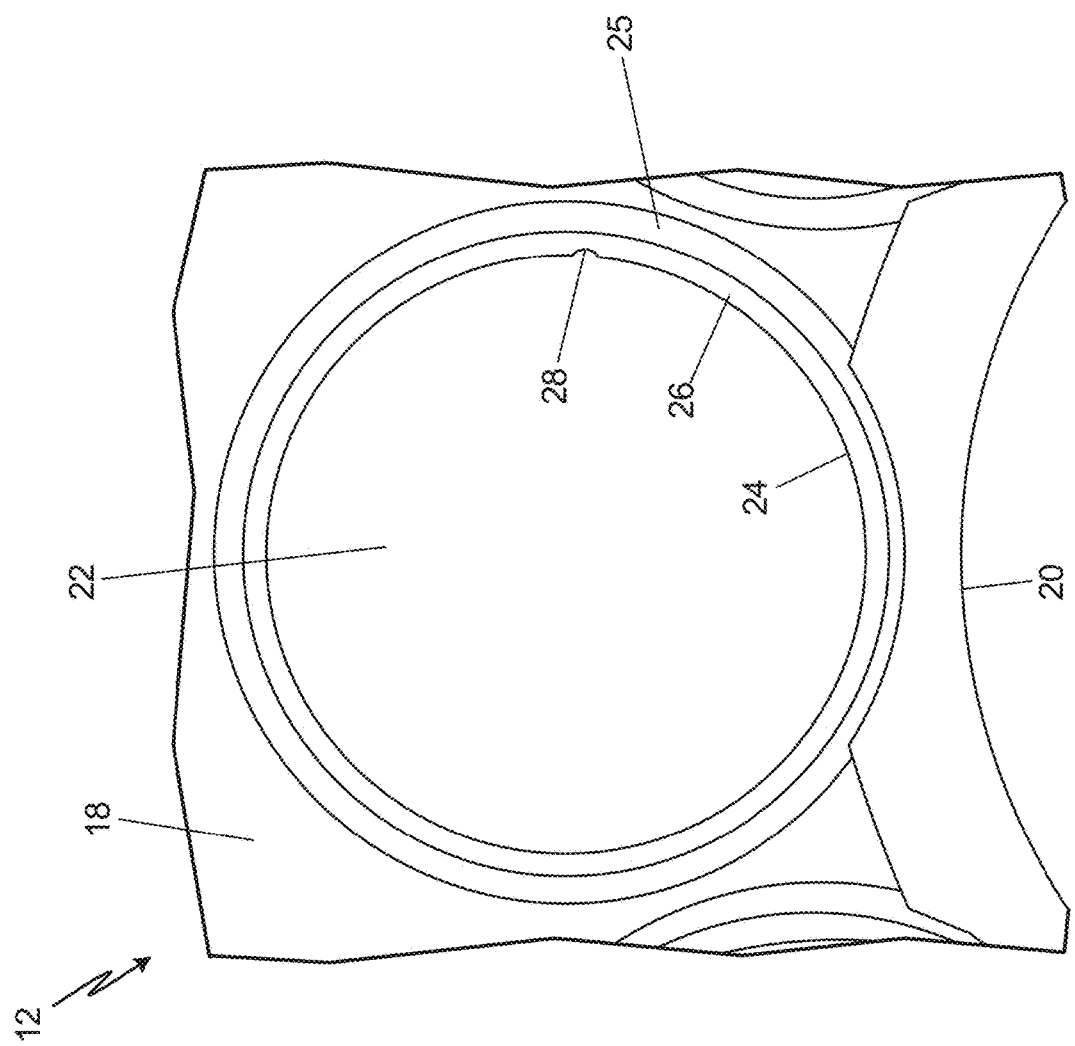
FIG. 1B is a partial bottom view of the first embodiment of the piston retainer plate.

FIG. 1A is a partial cross-sectional view of piston assembly 10 showing piston 14 within piston pocket 24 of piston retainer plate 12. FIG. 1B is a partial bottom view of piston retainer plate 12. FIGS. 1A and 1B will be discussed together. Piston assembly 10 includes piston retainer plate 12 and piston 14. Piston retainer plate 12 includes first end 16 (shown in FIG. 1A), second end 18, inner sidewall 20 (shown in FIG. 1B), piston pocket 22, straight annular surface 24, angled annular surface 25, curved annular surface 26, and curved vent 28. Piston 14 includes piston shaft 30, curved piston portion 32, and end 34.

Piston assembly 10 is part of a bent-axis fuel variable displacement piston pump. Piston retainer plate 12 may be annular and may hold one or more pistons 14. For example, piston retainer plate 12 may hold nine pistons. Piston 14 extends through piston retainer plate 12 and is positioned to move, or rotate, on a bent axis. As such, piston 14 changes angles with respect to retainer plate 12.

Piston retainer plate 12 has first end 16 on one end and second end 18 on the other end, opposite first end 16. For example, first end 16 may be a top end, and second end 18 may be a bottom end. Inner sidewall 20 extends from first end 16 to second end 18. Piston pocket 22 is an opening, or a space, that extends from first end 16 to second end 18 of piston retainer plate 12. Piston pocket 22 is defined by straight annular surface 24, angled annular surface 25, and curved annular surface 26. Straight annular surface 24 extends from first end 16 and is perpendicular to first end 16. Angled annular surface 25 extends at an angle from second end 18 such that angled annular surface 25 forms a chamfered portion of piston retainer plate 12. Curved annular surface 26 extends at an angle from and is connected to straight annular surface 24. Curved annular surface 26 is also connected to angled annular surface 25 such that curved annular surface 26 is between straight annular surface 24 and angled annular surface 25. Curved annular surface 26 curves as curved annular surface 16 extends from straight annular surface 24 to angled annular surface 25 such that curved annular surface 26 is concave. Curved vent 28 is within curved annular surface 26. In this embodiment, curved vent 28 is a curved indent, or space, that extends vertically along curved annular surface 26 and straight annular surface 24 to first end 16. As such, curved vent 28 is concave. The size of curved vent 28 can be tuned based on damping needs of piston assembly 10. Curved vent 28 is positioned within curved annular surface 26 where the most contact between piston 14 and piston retainer plate 12 occurs.

Piston 14 has cylindrical piston shaft 30, which extends through piston pocket 22 of piston retainer plate 12. Piston shaft 30 has a bent axis with respect to piston retainer plate 12. Curved piston portion 32 extends from piston shaft 30 adjacent end 34 of piston shaft 32. Curved piston portion 32 is semi-spherical, or has a half-sphere shape, and is sized to fit within piston pocket 22. As such, the radius of curved piston portion 32 is closely matched to the radius of piston pocket 22. Curved piston portion 32 extends into piston pocket 22 and contacts curved annular surface 26, creating a contact interface between piston 14 and piston retainer plate 12. Curved vent 28 is positioned in curved annular surface 26 at the wear interface, the portion of curved annular surface 26 where the most contact between curved piston portion 32 and curved annular surface 26 occurs. As such, curved vent 28 contacts curved piston portion 32 of piston 14. End 34 is an end of piston 14, end 34 being adjacent a piston ball and bearing.

Piston retainer plate 12 is bolted into place within a bent-axis fuel variable displacement piston pump. Piston pocket 22 of piston retainer plate 12 holds curved piston portion 32 of piston 14. Piston shaft 30 rotates along the bent axis to change the stroke of piston 14, changing the angle at which piston 14 extends relative to piston retainer plate 12. As a result, piston 14 spins on different axes. Angled annular surface 25 is angled outward, forming a larger portion of piston pocket 22 adjacent second end 18, to allow clearance between piston retainer plate 12 and curved piston portion 32 as the angle between the axis of piston 14 changes relative to piston pocket 22. As piston 14 rotates, curved piston portion 32 rotates within piston pocket 22, changing the distance between curved piston portion 32 and curved annular surface 26, which accommodates curved piston portion 32. As a result, different portions of an outer surface of curved piston portion 32 contact curved annular surface 26 of piston retainer plate 12 as piston 14 rotates along the bent axis.

Curved vent 28 creates a curve-on-curve contact interface between curved piston portion 32 of piston 14 and curved vent 28 of piston retainer plate 12 at the wear interface. As such, curved vent 28 maximizes the potential contact area at the wear interface between piston retainer plate 12 and piston 14.

Additionally, curved vent 28 receives fuel from within piston pocket 22, venting fuel during the stroke of piston 14. As such, fuel moves through curved vent 28. When curved piston portion 32 of piston 14 is moving toward curved annular surface 26 of piston retainer plate 12, curved vent 28 receives fuel from within piston pocket 22 such that fuel moves through curved vent 28 from piston pocket 22 to escape piston pocket 22. When curved piston portion 32 of piston 14 is moving away from curved annular surface 26 of piston retainer plate 12, curved vent 28 releases fuel such that fuel moves through curved vent 28 back to piston pocket 22 to reintroduce fuel to piston pocket 22.

Traditionally, a sphere-on-plate wear interface is present between the piston and the piston retainer plate in a bent axis fuel variable displacement piston pump. Because the curved piston portion of the piston has a radius that is closely matched to the radius of the piston pocket of the retainer plate, wear at the wear interface between the piston and the piston retainer plate can be damaging to the piston assembly, and fuel can get trapped and create detrimentally high velocities within the piston assembly as the fuel tries to escape.

Curved vent 28 of piston retainer plate 12 maximizes the potential contact area at the wear interface between piston retainer plate 12 and piston 14 to prevent localized contact stress and prevent pressure velocities from exceeding material capability under applied loads and relative motion. Because piston 14 can rotate within piston pocket 22 and the specific orientation of piston 14 is not controlled, curved vent 28 being within curved annular surface 26 of piston retainer plate 12 ensures that curved vent 28 is in the proper position with respect to piston retainer plate, the location of highest contact between piston 14 and piston retainer plate 12, and controls venting. Providing localized venting to curved annular surface 26 via curved vent 28 allows for lubrication at the interface between piston 14 and piston retainer plate 12, which prevents hydrolock when piston 14 moves into contact with piston retainer plate 12 in a fuel-filled environment. As a result, damage to piston assembly 10 is less likely to occur. The size of curved vent 28 is tuned to optimally act as a damping orifice to reduce the load between piston 14 and piston retainer plate 12, which reduces shock loading. Because curved vent 28 reduces wear and lowers contact stress to piston retainer plate 12, piston retainer plate 12 can accommodate larger pumps with faster piston strokes that will have more impact force on piston retainer plate 12.

Figure 2:
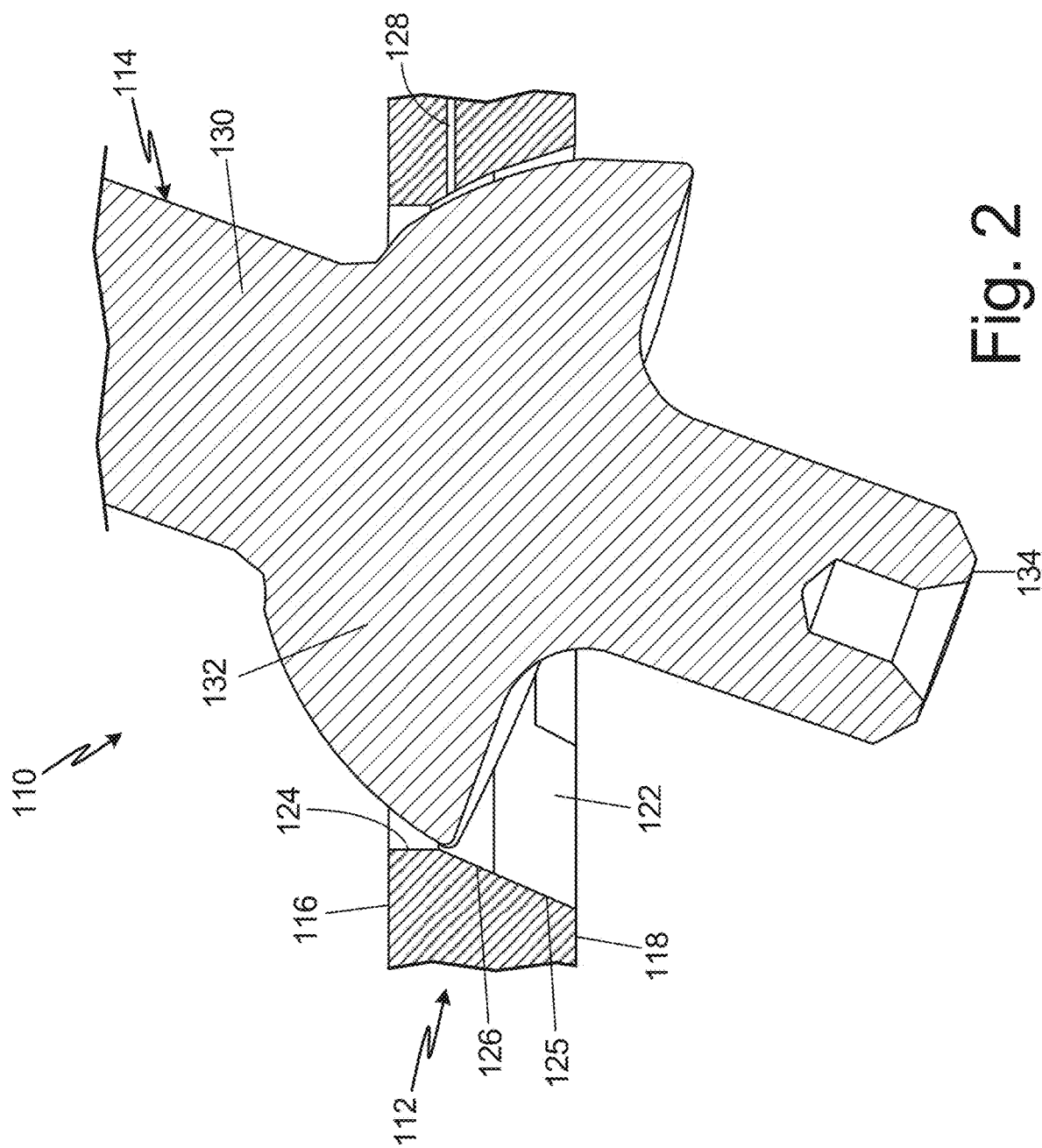
FIG. 2 is a partial cross-sectional view of a piston assembly showing a piston within a piston pocket of a second embodiment of a piston retainer plate.

FIG. 2 is a partial cross-sectional view of piston assembly 110 showing piston 114 within piston pocket 122 of piston retainer plate 112. Piston assembly 110 includes piston retainer plate 112 and piston 114. Piston retainer plate 112 includes first end 116, second end 118, piston pocket 122, straight annular surface 124, curved annular surface 126, and curved vent 128. Piston 114 includes piston shaft 130, curved piston portion 132, and end 134.

Piston assembly 110 has the same structure and function as piston assembly 10 described with respect to FIGS. 1A and 1B. However, piston assembly 110 has piston retainer plate 112 with curved vent 128 that extends horizontally from annular surface 126 and through piston retainer plate 212 rather than vertically along curved annular surface 126. Curved vent 128 is a circular port in curved annular surface 126 that extends horizontally into piston retainer plate 212 to form a horizontal cylindrical opening that extends from curved annular surface 26.

Figure 3A:
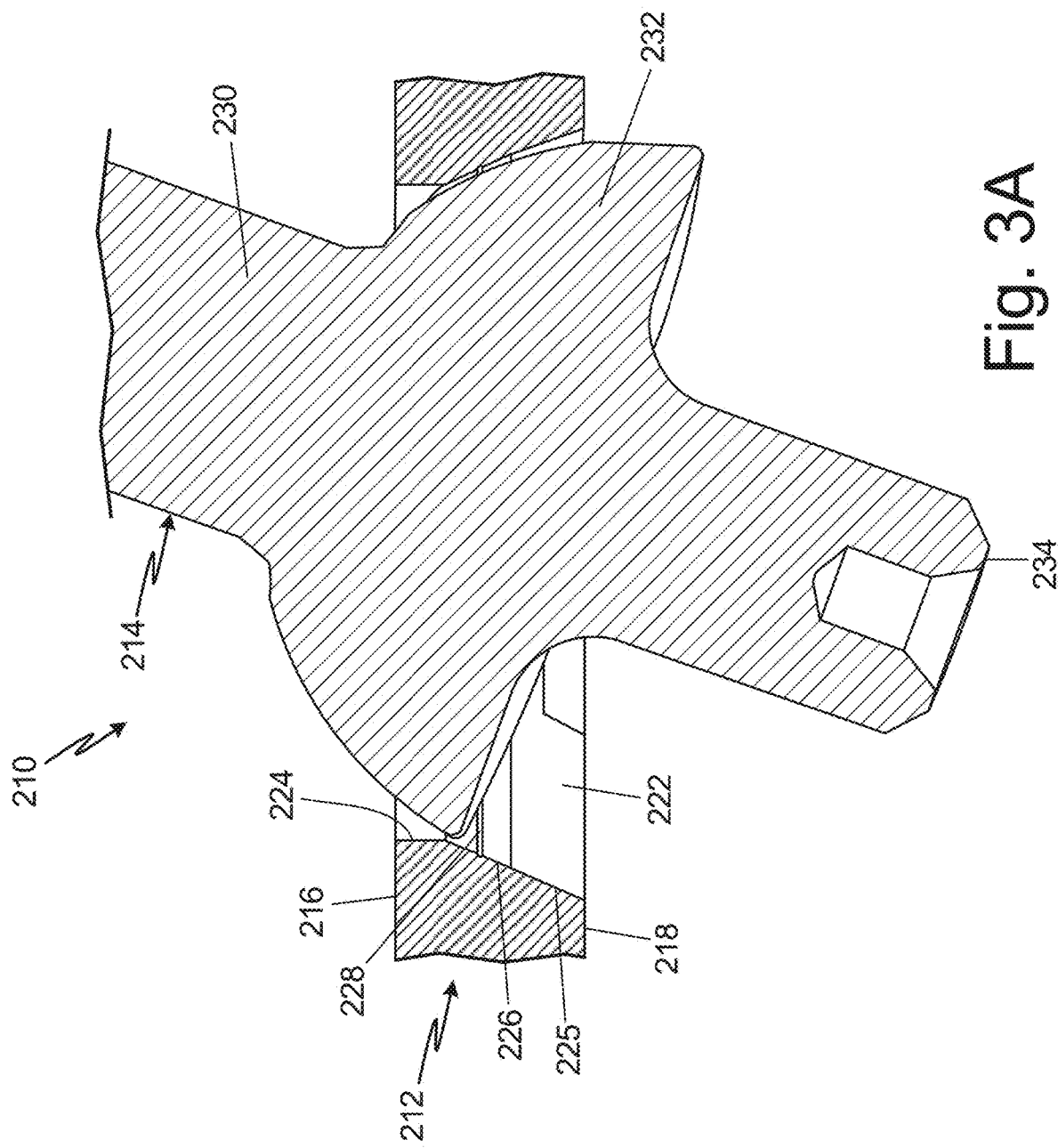
FIG. 3A is a partial cross-sectional view of a piston assembly showing a piston within a piston pocket of a third embodiment of a piston retainer plate.
Figure 3B:
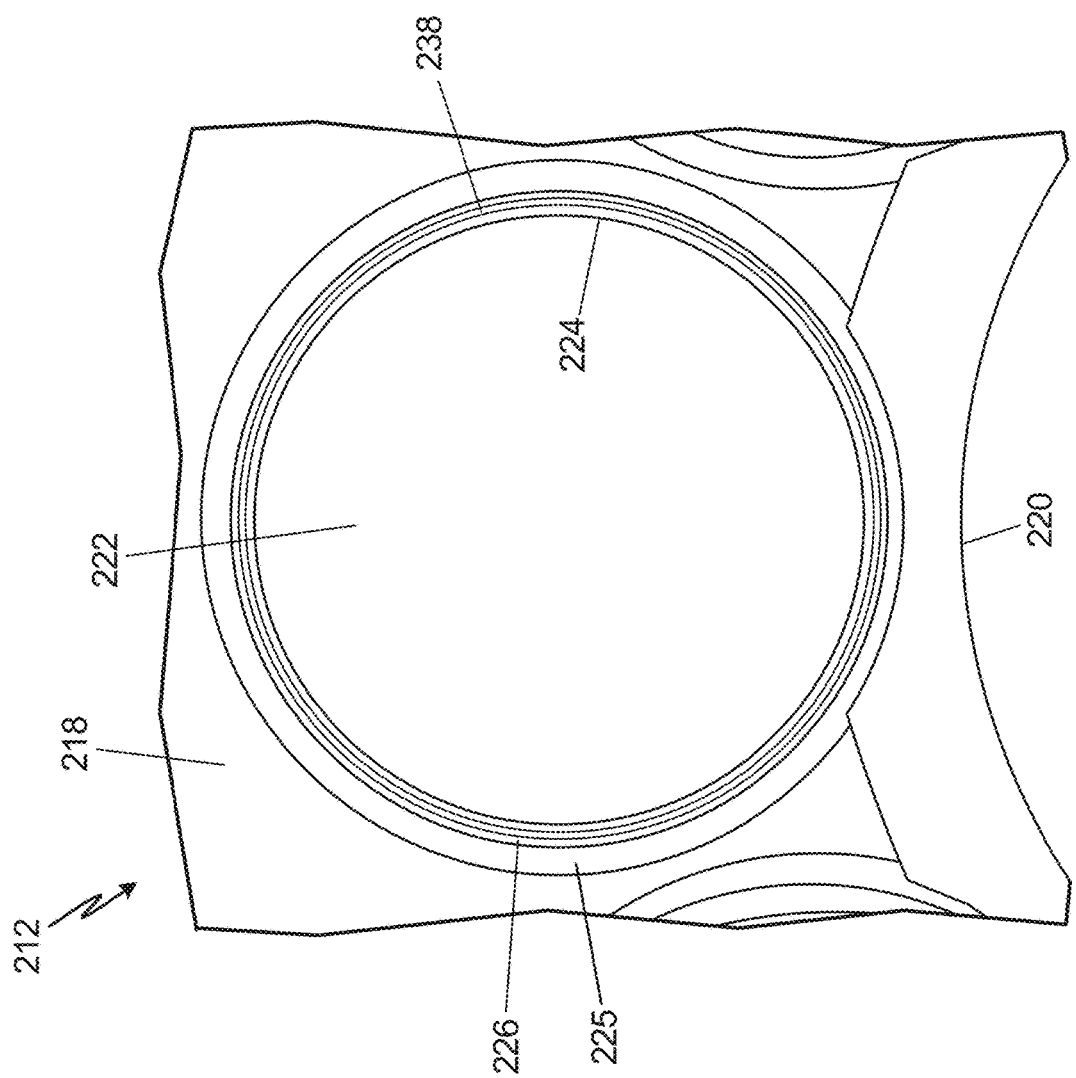
FIG. 3B is a partial bottom view of the third embodiment of the piston retainer plate.

FIG. 3A is a partial cross-sectional view of piston assembly 210 showing piston 214 within piston pocket 222 of piston retainer plate 212. FIG. 3B is a partial bottom view of piston retainer plate 212. FIGS. 3A and 3B will be discussed together. Piston assembly 210 includes piston retainer plate 212 and piston 214. Piston retainer plate 212 includes first end 216 (shown in FIG. 3A), second end 218, inner sidewall 220 (shown in FIG. 3B), piston pocket 222, straight annular surface 224, curved annular surface 226, and curved vent 228. Piston 214 includes piston shaft 230, curved piston portion 232, and end 234.

Piston assembly 210 has the same structure and function as piston assembly 10 described with respect to FIGS. 1A and 1B. However, piston assembly 210 has piston retainer plate 212 with curved vent 228 that extends horizontally along annular surface 226 to form a ring along annular surface 226 rather than vertically along curved annular surface 226. Curved vent 228 is a curved indent, or space, that extends into curved annular surface 226 and extends horizontally along an entire circumference of curved annular surface 226 to form an indented ring. As such, curved vent 228 is concave.

Figure 4:
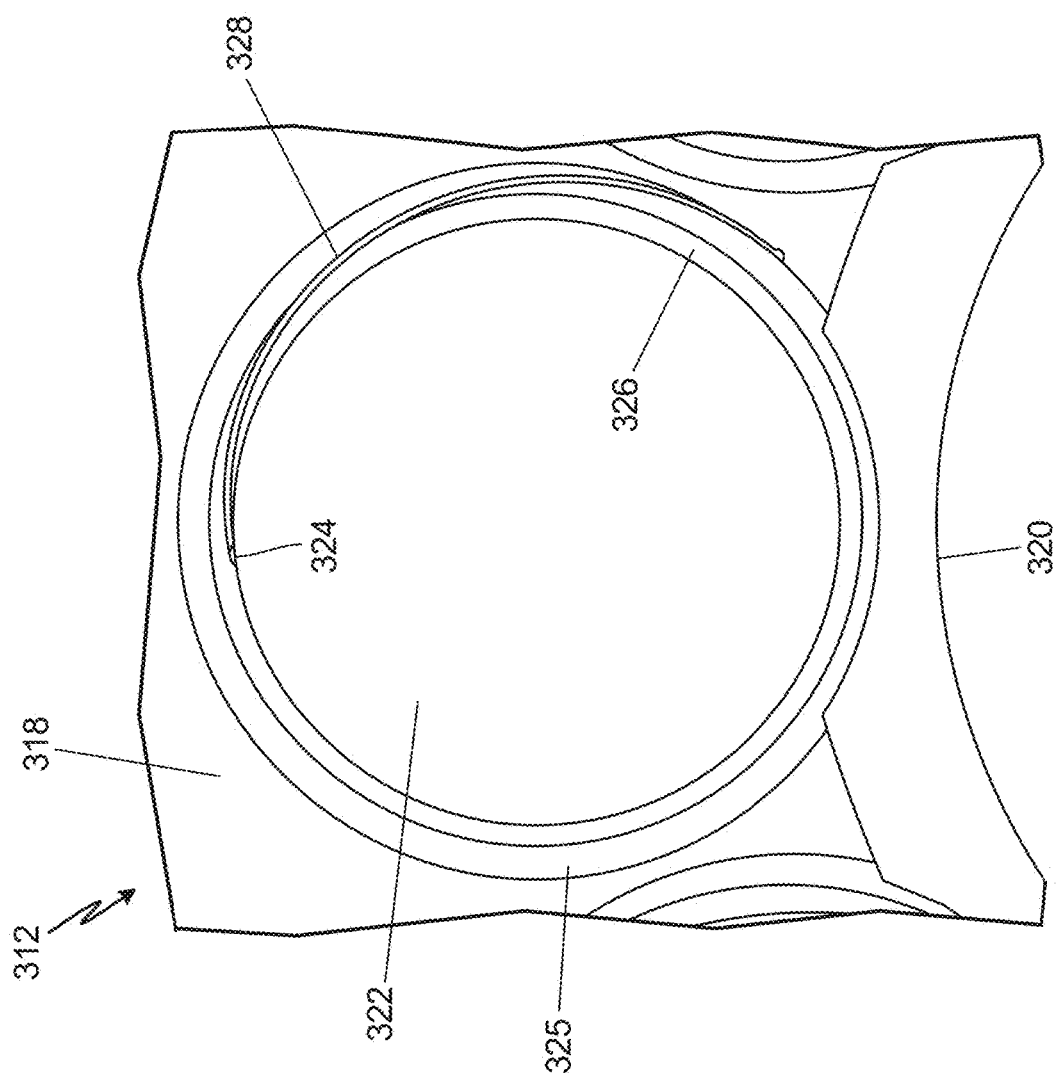
FIG. 4 is a partial bottom view of a fourth embodiment of a piston retainer plate.

FIG. 4 is a partial bottom view of piston retainer plate 312. Piston retainer plate 312 includes second end 318, inner sidewall 320, piston pocket 322, straight annular surface 324, curved annular surface 326, and curved vent 328.

Piston retainer plate 312 has the same structure and function as piston retainer plate 12 described with respect to FIGS. 1A and 1B. However, piston retainer plate 312 has curved vent 328 that extends horizontally and vertically along annular surface 326 from second end 318 to straight annular surface 324 rather than vertically along curved annular surface 326. As such, curved vent 328 extends from second end 318, along angled annular surface 325, along curved annular surface 326, and reaches straight annular surface 324. Curved vent 328 is a curved indent, or space, that extends into curved annular surface 326 and extends vertically and horizontally, or at an angle, along curved annular surface 326 and angled annular surface 325 to form a portion of a spiral. As such, curved vent 328 is concave.

Figure 5:
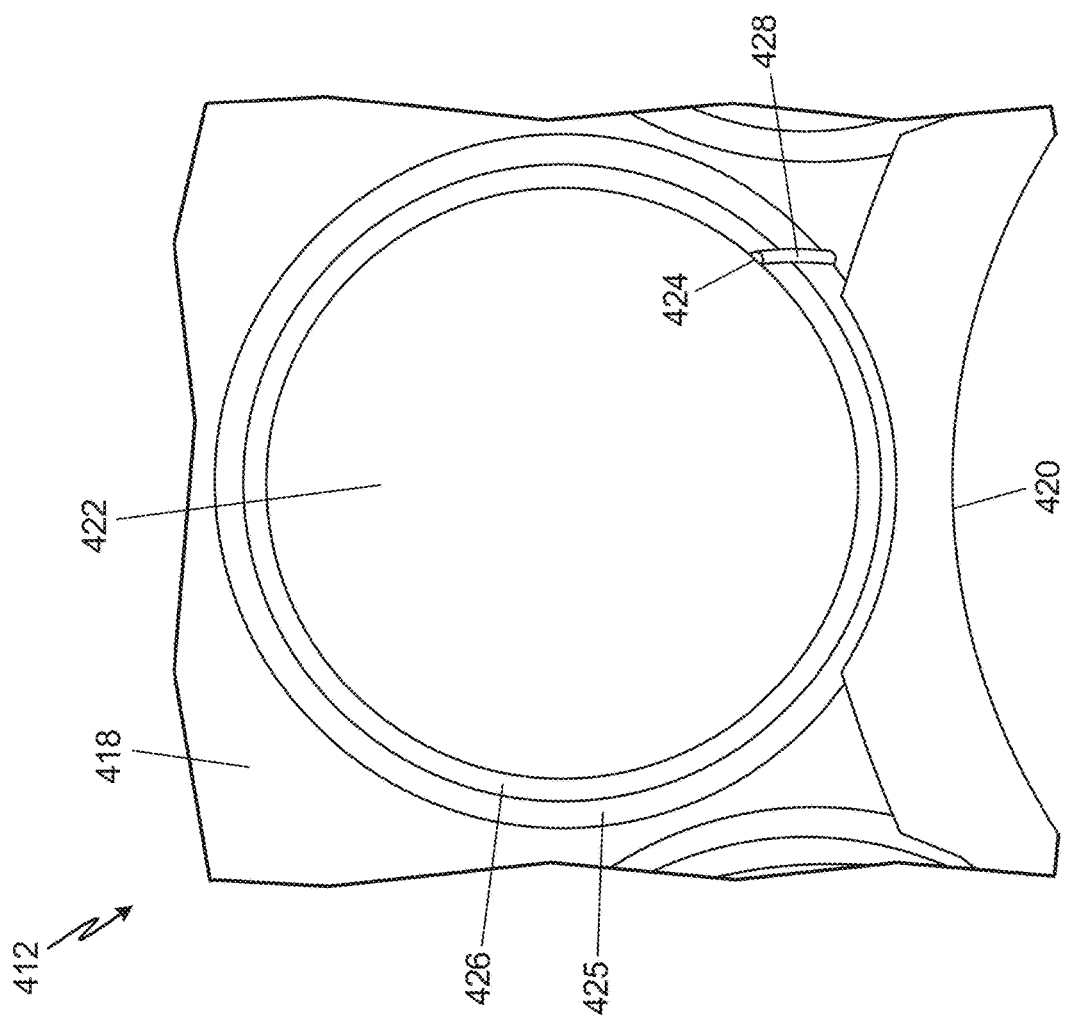
FIG. 5 is a partial bottom view of a fifth embodiment of a piston retainer plate.

FIG. 5 is a partial bottom view of piston retainer plate 412. Piston retainer plate 412 includes second end 418, inner sidewall 420, piston pocket 422, straight annular surface 424, curved annular surface 426, and curved vent 428.

Piston retainer plate 412 has the same structure and function as piston retainer plate 12 described with respect to FIGS. 1A and 1B. However, piston retainer plate 412 has curved vent 428 that extends horizontally and vertically along annular surface 426 from second end 418 to straight annular surface 424 rather than vertically along curved annular surface 426. As such, curved vent 428 extends from second end 418, along angled annular surface 425, along curved annular surface 426, and reaches straight annular surface 424. Curved vent 428 is a curved indent, or space, that extends into curved annular surface 426 and angled annular surface 425. Curved vent 428 extends vertically and horizontally at a sharper angle along curved annular surface 426 and angled annular surface 425 than curved vent 328 does along curved annular surface 326, described with respect to FIG. 4. Curved vent 328 forms a portion of a spiral. As such, curved vent 328 is concave.

Discussion of Possible Embodiments

The following are non-exclusive descriptions of possible embodiments of the present invention.

A piston retainer plate includes a first end; a second end opposite the first end; a piston pocket extending from the first end to the second end; a straight annular surface extending from the first end; an angled annular surface extending at an angle from the second end; a curved annular surface connected to the straight annular surface and the angled annular surface, the curved annular surface being between the straight annular surface and the angled annular surface; and a curved vent within the curved annular surface; wherein the straight annular surface, the angled annular surface, and the curved annular surface define the piston pocket.

The piston retainer plate of the preceding paragraph can optionally include, additionally and/or alternatively, any one or more of the following features, configurations and/or additional components:

The curved vent is concave.

The curved vent is configured to receive fuel from within the piston pocket to vent the fuel.

The curved vent is configured to contact a curved portion of a piston.

The curved vent is an indent that extends into the curved annular surface and extends vertically along the curved annular surface and along the straight annular surface to the second end.

The curved vent is a circular port in the curved annular surface that extends horizontally into the piston retainer plate to form a horizontal cylindrical opening that extends from the curved annular surface.

The curved vent is a curved indent that extends into the curved annular surface and extends horizontally along the curved annular surface to form a ring.

The curved vent is an indent that extends into the curved annular surface and extends vertically and horizontally along the curved annular surface to form a portion of a spiral.

The curved vent is positioned within curved annular surface at a portion of curved annular surface that has the most contact with a curved piston portion of a piston.

A piston assembly includes a piston comprising: a piston shaft; and a curved piston portion extending from the piston shaft adjacent an end of the piston shaft; and a piston retainer plate comprising: a straight annular surface extending from a first end; an angled annular surface extending at an angle from a second end; a curved annular surface connected to the straight annular surface and the angled annular surface; and a curved vent within the curved annular surface; wherein the piston extends through the piston retainer plate, and the curved vent of the piston retainer plate is positioned within the curved annular surface at a portion of the curved annular surface that has the most contact with the curved piston portion of the piston.

The piston assembly of the preceding paragraph can optionally include, additionally and/or alternatively, any one or more of the following features, configurations and/or additional components:

The piston is configured to move along a bent axis with respect to the piston retainer plate.

The piston assembly is configured for use in a bent-axis fuel variable displacement piston pump.

The curved vent is an indent that extends into the curved annular surface and extends vertically along the curved annular surface and along the straight annular surface to the second end.

The curved vent is a circular port in the curved annular surface that extends horizontally into the piston retainer plate to form a horizontal cylindrical opening that extends from the curved annular surface.

The curved vent is a curved indent that extends into the curved annular surface and extends horizontally along the curved annular surface to form a ring.

The curved vent is an indent that extends into the curved annular surface and extends vertically and horizontally along the curved annular surface to form a portion of a spiral.

The straight annular surface, the angled annular surface, and the curved annular surface define a piston pocket of the piston retainer plate.

The curved vent is configured to receive fuel from within the piston pocket to vent the fuel.

The curved piston portion of the piston extends into the piston pocket.

The curved vent is concave.

A piston assembly for a bent-axis fuel variable displacement piston pump includes a piston configured to move on a bent axis; and a piston retainer plate configured to hold the piston, the piston retainer plate comprising: a piston pocket extending through the piston retainer plate, the piston pocket being configured to hold the piston; a curved annular surface that defines a portion of the piston pocket; and a curved vent in the curved annular surface, the curved vent being configured to receive fuel from within the piston pocket when the piston is moving toward the curved annular surface and release fuel into the piston pocket when the piston is moving away from the curved annular surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston retainer plate comprising:
   a first end;
   a second end opposite the first end;
   a piston pocket extending from the first end to the second end;
   a straight annular surface extending from the first end;
   an angled annular surface extending at an angle from the second end;
   a curved annular surface connected to the straight annular surface and the angled annular surface, the curved annular surface being between the straight annular surface and the angled annular surface; and
   a curved vent within the curved annular surface;
   wherein the straight annular surface, the angled annular surface, and the curved annular surface define the piston pocket.

2. The piston retainer plate of claim 1, wherein the curved vent is concave.

3. The piston retainer plate of claim 1, wherein the curved vent is configured to receive fuel from within the piston pocket to vent the fuel.

4. The piston retainer plate of claim 1, wherein the curved vent is configured to contact a curved portion of a piston.

5. The piston retainer plate of claim 1, wherein the curved vent is an indent that extends into the curved annular surface and extends vertically along the curved annular surface and along the straight annular surface to the second end.

6. The piston retainer plate of claim 1, wherein the curved vent is a circular port in the curved annular surface that extends horizontally into the piston retainer plate to form a horizontal cylindrical opening that extends from the curved annular surface.

7. The piston retainer plate of claim 1, wherein the curved vent is a curved indent that extends into the curved annular surface and extends horizontally along the curved annular surface to form a ring.

8. The piston retainer plate of claim 1, wherein the curved vent is an indent that extends into the curved annular surface and extends vertically and horizontally along the curved annular surface to form a portion of a spiral.

9. The piston retainer plate of claim 1, wherein the curved vent is positioned within curved annular surface at a portion of curved annular surface that has the most contact with a curved piston portion of a piston.

10. A piston assembly comprising:
    a piston comprising:
      a piston shaft; and
      a curved piston portion extending from the piston shaft adjacent an end of the piston shaft; and
    a piston retainer plate comprising:
      a straight annular surface extending from a first end;
      an angled annular surface extending at an angle from a second end;
      a curved annular surface connected to the straight annular surface and the angled annular surface; and
      a curved vent within the curved annular surface;
    wherein the piston extends through the piston retainer plate, and the curved vent of the piston retainer plate is positioned within the curved annular surface at a portion of the curved annular surface that has the most contact with the curved piston portion of the piston.

11. The piston assembly of claim 10, wherein the piston is configured to move along a bent axis with respect to the piston retainer plate.

12. The piston assembly of claim 10, wherein the piston assembly is configured for use in a bent-axis fuel variable displacement piston pump.

13. The piston assembly of claim 10, wherein the curved vent is an indent that extends into the curved annular surface and extends vertically along the curved annular surface and along the straight annular surface to the second end.

14. The piston assembly of claim 10, wherein the curved vent is a circular port in the curved annular surface that extends horizontally into the piston retainer plate to form a horizontal cylindrical opening that extends from the curved annular surface.

15. The piston assembly of claim 10, wherein the curved vent is a curved indent that extends into the curved annular surface and extends horizontally along the curved annular surface to form a ring.

16. The piston assembly of claim 10, wherein the curved vent is an indent that extends into the curved annular surface and extends vertically and horizontally along the curved annular surface to form a portion of a spiral.

17. The piston assembly of claim 10, wherein the straight annular surface, the angled annular surface, and the curved annular surface define a piston pocket of the piston retainer plate.

18. The piston assembly of claim 17, wherein the curved vent is configured to receive fuel from within the piston pocket to vent the fuel.

19. The piston assembly of claim 17, wherein the curved piston portion of the piston extends into the piston pocket.

20. A piston assembly for a bent-axis fuel variable displacement piston pump, the piston assembly comprising:
    a piston configured to move on a bent axis; and
    a piston retainer plate configured to hold the piston, the piston retainer plate comprising:
      a piston pocket extending through the piston retainer plate, the piston pocket being configured to hold the piston;
      a curved annular surface that defines a portion of the piston pocket; and
      a curved vent in the curved annular surface, the curved vent being configured to receive fuel from within the piston pocket when the piston is moving toward the curved annular surface and release fuel into the piston pocket when the piston is moving away from the curved annular surface.

* * * * *